United States Patent
Liu et al.

(10) Patent No.: US 11,710,042 B2
(45) Date of Patent: *Jul. 25, 2023

(54) SHAPING A NEURAL NETWORK ARCHITECTURE UTILIZING LEARNABLE SAMPLING LAYERS

(71) Applicant: Adobe Inc., San Jose, CA (US)

(72) Inventors: Shikun Liu, London (GB); Zhe Lin, Fremont, CA (US); Yilin Wang, San Jose, CA (US); Jianming Zhang, Campbell, CA (US); Federico Perazzi, San Jose, CA (US)

(73) Assignee: Adobe Inc., San Jose, CA (US)

( * ) Notice: Subject to any disclaimer, the term of this patent is extended or adjusted under 35 U.S.C. 154(b) by 606 days.

This patent is subject to a terminal disclaimer.

(21) Appl. No.: 16/782,793

(22) Filed: Feb. 5, 2020

(65) Prior Publication Data

US 2021/0241111 A1 Aug. 5, 2021

(51) Int. Cl.
*G06N 3/04* (2023.01)
*G06N 3/082* (2023.01)

(52) U.S. Cl.
CPC ............... *G06N 3/082* (2013.01); *G06N 3/04* (2013.01)

(58) Field of Classification Search
None
See application file for complete search history.

(56) References Cited

U.S. PATENT DOCUMENTS

| 6,882,992 | B1* | 4/2005 | Werbos | G05B 13/027 |
| | | | | 706/48 |
| 10,970,441 | B1* | 4/2021 | Zhang | G06N 3/063 |
| 2017/0046616 | A1* | 2/2017 | Socher | G06F 30/00 |
| 2017/0161640 | A1* | 6/2017 | Shamir | G06N 20/00 |
| 2018/0225823 | A1* | 8/2018 | Zhou | G06V 30/19173 |
| 2018/0357893 | A1* | 12/2018 | Dong | G06Q 30/0205 |
| 2019/0213482 | A1* | 7/2019 | Socher | G06F 30/00 |
| 2019/0294929 | A1 | 9/2019 | Yao et al. | |
| 2020/0314827 | A1* | 10/2020 | Ge | H04B 7/10 |
| 2020/0387783 | A1* | 12/2020 | Bagherinezhad | G06N 3/08 |
| 2020/0410365 | A1* | 12/2020 | Cheung | G06N 3/084 |

(Continued)

OTHER PUBLICATIONS

Vijay Badrinarayanan, Alex Kendall, and Roberto Cipolla. Segnet: A deep convolutional encoder-decoder architecture for image segmentation. IEEE transactions on pattern analysis and machine intelligence, 39(12):2481-2495, 2017.

(Continued)

*Primary Examiner* — William J Jacob
(74) *Attorney, Agent, or Firm* — Keller Preece PLLC

(57) ABSTRACT

The present disclosure relates to shaping the architecture of a neural network. For example, the disclosed systems can provide a neural network shaping mechanism for at least one sampling layer of a neural network. The neural network shaping mechanism can include a learnable scaling factor between a sampling rate of the at least one sampling layer and an additional sampling function. The disclosed systems can learn the scaling factor based on a dataset while jointly learning the network weights of the neural network. Based on the learned scaling factor, the disclosed systems can shape the architecture of the neural network by modifying the sampling rate of the at least one sampling layer.

20 Claims, 9 Drawing Sheets

(56) References Cited

U.S. PATENT DOCUMENTS

2021/0241112 A1* 8/2021 Dai ................ G06V 10/82

OTHER PUBLICATIONS

Andrew Brock, Theodore Lim, James M Ritchie, and Nick Weston. Smash: one-shot model architecture search through hypernetworks. arXiv preprint arXiv:1708.05344, 2017.

Marius Cordts, Mohamed Omran, Sebastian Ramos, Timo Rehfeld, Markus Enzweiler, Rodrigo Benenson, Uwe Franke, Stefan Roth, and Bernt Schiele. The cityscapes dataset for semantic urban scene understanding. In Proceedings of the IEEE conference on computer vision and pattern recognition, pp. 3213-3223, 2016.

Jonathan Frankie and Michael Carbin. The lottery ticket hypothesis: Finding sparse, trainable neural networks. arXiv preprint arXiv:1803.03635, 2018.

Ariel Gordon, Elad Eban, Ofir Nachum, Bo Chen, Hao Wu, Tien-Ju Yang, and Edward Choi. Morphnet: Fast & simple resource-constrained structure learning of deep networks. In Proceedings of the IEEE Conference on Computer Vision and Pattern Recognition, pp. 1586-1595, 2018.

Kaiming He, Xiangyu Zhang, Shaoqing Ren, and Jian Sun. Deep residual learning for image recognition. In Proceedings of the IEEE conference on computer vision and pattern recognition, pp. 770-778, 2016.

Hanxiao Liu, Karen Simonyan, and Yiming Yang. Darts: Differentiable architecture search. arXiv preprint arXiv:1806.09055, 2018.

Zhuang Liu, Jianguo Li, Zhiqiang Shen, Gao Huang, Shoumeng Yan, and Changshui Zhang. Learning efficient convolutional networks through network slimming. In Proceedings of the IEEE International Conference on Computer Vision, pp. 2736-2744, 2017.

Christos Louizos, Max Welling, and Diederik P Kingma. Learning sparse neural networks through $l\_0$ regularization. arXiv preprint arXiv:1712.01312, 2017.

Pushmeet Kohli Nathan Silberman, Derek Hoiem and Rob Fergus. Indoor segmentation and support inference from rgbd images. In ECCV, 2012.

Hieu Pham, Melody Y Guan, Barret Zoph, Quoc V Le, and Jeff Dean. Efficient neural architecture search via parameter sharing. arXiv preprint arXiv:1802.03268, 2018.

Siyuan Qiao, Zhe Lin, Jianming Zhang, and Alan Yuille. Neural rejuvenation: Improving deep network training by enhancing computational resource utilization. arXiv preprint arXiv:1812.00481, 2018.

Esteban Real, Alok Aggarwal, Yanping Huang, and Quoc V Le. Regularized evolution for image classifier architecture search. arXiv preprint arXiv:1802.01548, 2018.

Karen Simonyan and Andrew Zisserman. Very deep convolutional networks for large-scale image recognition. arXiv preprint arXiv:1409.1556, 2014.

Barret Zoph and Quoc V Le. Neural architecture search with reinforcement learning. arXiv preprint arXiv:1611.01578, 2016.

Guo, et al., "Training Efficient Network Architecture and Weights via Direct Sparsity Control", arXiv:2002.04301v1 [cs.LG] (Year: 2020)

U.S. Appl. No. 16/799,191, Sep. 27, 2022, Office Action.

U.S. Appl. No. 16/799,191, dated Jan. 20, 2023, Notice of Allowance.

\* cited by examiner

| Dataset | Vanilla | VGG-19 Shape Adaptor | | |
|---|---|---|---|---|
| | | Human | Half | Full |
| CIFAR-10 | 93.64 ± 0.14 | 95.05 ± 0.18 | 95.05 ± 0.09 | 94.84 ± 0.18 |
| CIFAR-100 | 73.77 ± 0.33 | 79.14 ± 0.15 | 79.17 ± 0.24 | 77.36 ± 0.32 |

SHAPING A NEURAL NETWORK ARCHITECTURE UTILIZING LEARNABLE SAMPLING LAYERS

BACKGROUND

Recent years have seen significant advancement in hardware and software platforms that implement neural network models for processing digital data. In particular, many systems implement a neural network trained on a dataset to perform a particular task, such as classifying an object in a digital image. However, deep neural networks are often structurally large and require large amounts of computing resources and memory to generate, train, and operate. The structure and operations of deep neural networks are often decided by empirical choices that require significant expert knowledge. Though expert knowledge from a human designer is often used to select a neural network that can effectively perform a task, some conventional systems incorporate automated machine learning (AutoML) to alleviate some of the need for human efforts. For example, using a neural architecture search (NAS) approach, an automated machine learning system can automatically discover optimal operations in a given fixed architecture. Despite these advances, however, conventional automated machine learning systems suffer from several technological shortcomings that result in inflexible, inefficient, and inaccurate operation.

For example, conventional automated machine learning systems are often inflexible in that they fail to adapt a neural network to different tasks. To illustrate, while some conventional systems can utilize the NAS approach to learn operations to perform within a neural network, such systems rigidly design the neural network for a single task. Accordingly, such systems are often incapable of adapting the design of the neural network for other tasks. Moreover, while the particular operations are learned, the neural network architecture itself is typically fixed. Indeed, such conventional systems often rely on an architecture that has been previously selected for the desired task. Thus, these conventional systems fail to flexibly adapt the structure of the neural network where needed to perform the task more effectively. As a further matter, such conventional systems are inflexible in that they typically continue to rely on human efforts to select the fixed architecture (e.g., the number of included layers, the number of filters in each layer, etc.).

In addition to flexibility concerns, conventional automated machine learning systems can also operate inaccurately. To illustrate, conventional systems utilizing an NAS approach are still prone to human error as they rely on human-designed neural network architectures, which may be sub-optimal for a given task. Accordingly, the outputs of these neural networks can contain inaccuracies with respect to the task.

In addition to problems with inflexibility and inaccuracy, conventional automated machine learning systems are also inefficient. For example, conventional systems implementing an NAS algorithm often require extensive computational time and power—sometimes equaling that required to train a large number of neural networks in parallel from scratch—in order to learn the optimal operations. Because of the large amounts of computational resources required, this solution precludes operation on mobile devices, such as smartphones, wearable devices, tablets, and other internet-connected devices.

SUMMARY

One or more embodiments described herein provide benefits and/or solve one or more problems in the art with systems, methods, and non-transitory computer-readable media that utilize learnable sampling layers to flexibly shape the architecture of a neural network. For example, in one or more embodiments, a system provides a shape adaptor for a sampling layer of a neural network. In particular, the system can build the shape adaptor on top of two sampling branches that include the sampling layer and an additional sampling function (e.g., an identity function). The system can utilize the shape adaptor to automatically learn a scaling factor based on a dataset that corresponds to a particular task. In one or more embodiments, the system learns the scaling factor using standard back-propagation and end-to-end optimization techniques. Based on the learned scaling factor, the system can apply a shape transformation to the sampling layer. In this manner, the system can reason on in-coming data to efficiently and flexibly change the neural network structure via linear interpolation between the two branches to enable the neural network to accurately perform a task.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
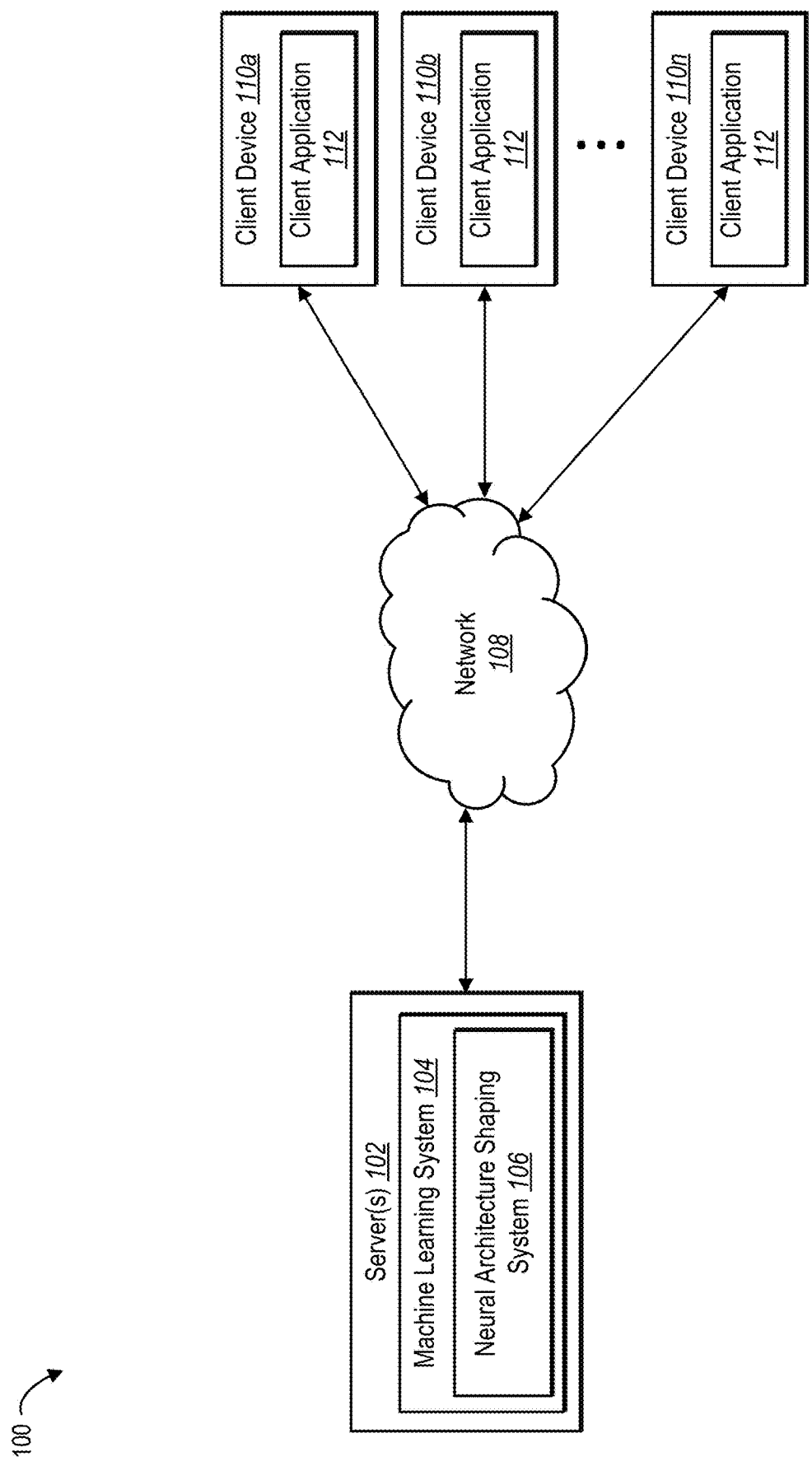
FIG. 1 illustrates an example system environment in which a neural architecture shaping system can operate in accordance with one or more embodiments.

One or more embodiments described herein include a neural architecture shaping system that utilizes learnable reshaping operators (i.e., shape adaptors) to flexibly adapt the architecture of a neural network to accurately perform a desired task. In particular, the neural architecture shaping system can utilize a shape adaptor as a flexible and differentiable sampling mechanism that can be included into various layers of a neural network architecture. For example, in one or more embodiments, the neural architecture shaping system provides a shape adaptor for a sampling layer of a neural network. In particular, the system can build the shape adaptor on top of two sampling branches that include the sampling layer and an additional sampling function, such as an identity function. The system can utilize the shape adaptor, along with the neural network, to automatically learn (e.g., via back-propagation and end-to-end optimization) a scaling factor. Based on the learned scaling factor, the system can reshape the sampling layer as needed to enable the neural network to effectively perform a task.

To provide an illustration, in one or more embodiments, the neural architecture shaping system initializes a neural network that includes a plurality of sampling layers and a plurality of network weights. The neural architecture shaping system provides a neural network shaping mechanism for at least one sampling layer of the neural network (referred to as a learnable sampling layer). In particular, the neural network shaping mechanism includes a learnable scaling factor between a sampling rate of the at least one sampling layer and an additional sampling function based on input to the at least one sampling layer. Based on a dataset (e.g., a dataset that corresponds to a particular task), the neural architecture shaping system jointly learns the scaling factor and the network weights. The neural architecture shaping system further, based on the learned scaling, shapes the architecture of the neural network by modifying the sampling rate of the at least one sampling layer.

As just mentioned, in one or more embodiments, the neural architecture shaping system provides a neural network shaping mechanism for at least one sampling layer of a neural network. The neural architecture shaping system can provide the neural network shaping mechanism at various positions within the neural network. Further, in one or more embodiments, the neural architecture shaping system provides a neural network shaping mechanism for a plurality of sampling layers within the neural network.

In one or more embodiments, a neural network shaping mechanism includes at least two sampling branches: a first branch that includes the sampling layer for which the neural network shaping mechanism is provided, and a second branch that includes an additional sampling function (i.e., an additional sampling layer). In one or more embodiments, the sampling layer includes an up-sampling layer, a down-sampling layer, or an identity layer. Similarly, in one or more embodiments, the additional sampling function includes an up-sampling function, a down-sampling function, or an identity function.

As further mentioned above, in one or more embodiments, the neural network shaping mechanism also includes a learnable scaling factor between the sampling layer and the additional sampling function based on input to the sampling layer. Indeed, the neural architecture shaping system can learn the scaling factor of the neural network shaping mechanism while jointly learning the network weights for the neural network itself. For example, the neural architecture shaping system can utilize the neural network to analyze a dataset (e.g., a dataset corresponding to a desired task for the neural network to perform) and iteratively modify the scaling factor and the network weights based on the analysis. In one or more embodiments, the neural architecture shaping system modifies the scaling factor and the network weights using back-propagation and end-to-end optimization techniques.

To provide further detail, for a given iteration, the neural architecture shaping system can utilize the neural network shaping mechanism to analyze input to the associated sampling layer. In particular, the neural architecture shaping system can generate a first feature map using the sampling rate of the sampling layer and generate a second feature map using the additional sampling function. In one or more embodiments, the sizes of the feature maps differ; therefore, the neural architecture shaping system can use an interpolation layer of the neural network shaping mechanism that resolves the size difference.

Additionally, as mentioned above, in one or more embodiments, the neural architecture shaping system shapes the architecture of the neural network based on the learned scaling factor. In particular, the neural architecture shaping system can modify the sampling rate of the sampling layer associated with the neural network shaping mechanism. Thus, the neural architecture shaping system can adjust the shape of a neural network to perform a desired task.

The neural architecture shaping system provides several advantages over conventional systems. For example, the neural architecture shaping system can operate more flexibly than conventional systems. In particular, by modifying a sampling rate of one or more sampling layers of a neural network, the neural architecture shaping system can flexibly adapt the architecture of a neural network based on the task to be performed. Accordingly, the neural architecture shaping system can flexibly shape the architecture of a neural network in various ways to accommodate various tasks. Additionally, the neural architecture shaping system can flexibly shape the architecture of the neural network where needed to better accommodate the particular task (i.e., to perform the task more effectively). Further, by adapting the shape of the neural network based on a learned scaling factor, the neural architecture shaping system avoids reliance on human input to select the neural network architecture.

Further, the neural architecture shaping system can improve accuracy. Indeed, by avoiding reliance on human input to select the architecture of the neural network, the neural architecture shaping system avoids human error in the architecture-design process. Thus, the resulting neural network can more optimally perform a task, leading to more accurate neural network outputs.

Additionally, the neural architecture shaping system can operate more efficiently than conventional neural network design techniques. In particular, by learning the scaling factor jointly with the network weights and shaping the neural network architecture based on the scaling, the neural architecture shaping system simplifies the process for determining the neural network architecture that is optimal for a task. Thus, the neural architecture shaping system can reduce the computational time and power required for learning the neural network architecture, especially when compared to many conventional systems implementing a NAS algorithm.

In addition to the foregoing, the neural architecture shaping system can be employed in a variety of machine learning situations. For example, the neural architecture shaping system can be employed in a transfer learning situation, where the initial network has been trained on a large dataset and is being adapted to a smaller dataset. In other embodiments, the neural architecture shaping system can be employed when initially training a neural network. In any event, the neural architecture shaping system can be employed to learn an optimal neural network architecture shape to perform a given task based on a given training dataset.

As illustrated by the foregoing discussion, the present disclosure utilizes a variety of terms to describe features and benefits of the neural architecture shaping system. Additional detail is now provided regarding the meaning of these terms. For example, as used herein, the term "neural network" refers to a machine learning model that can be tuned (e.g., trained) based on inputs to approximate unknown functions. In particular, the term neural network can include a model of interconnected artificial neurons (e.g., organized in layers) that communicate and learn to approximate complex functions and generate outputs based on a plurality of inputs provided to the model. For instance, the term neural network includes one or more machine learning algorithms. In addition, a neural network can refer to an algorithm (or set of algorithms) that implements deep learning techniques that utilize a set of algorithms to model high-level abstractions in data. To illustrate, a neural network can include, but is not limited to, a convolutional neural network (CNN), a residual learning neural network, a recurrent neural network (RNN), a generative adversarial neural network (GAN), a graph neural network (e.g., a graph convolutional neural network), a Region-CNN (R-CNN), a Faster R-CNN, a Mask R-CNN, single-shot detect (SSD) networks, etc.

As used herein, the term "neural network architecture" (or "architecture") refers to the structure of a neural network. In particular, a neural network architecture can refer to the structure of a neural network in its entirety or to the structure of a particular portion of the neural network. To illustrate, a neural network architecture can refer to the number of layers of a neural network and/or the type of one or more layers of the neural network.

Additionally, as used herein, the term "shape of a neural network" (or "shape of an architecture of a neural network" or "neural network shape") refers to the structure of the layers of the neural network. In particular, the shape of a neural network can refer to the structural design of one or more of the neural network layers—which can be referred to as the shape of those neural network layers. For example, the shape of a neural network can refer to the sampling rate or width (e.g., the number of filters or neurons) of one or more of the sampling layers of the neural network. Accordingly, modifying the shape of an architecture of a neural network can refer to modifying the shape of one or more of the sampling layers of the neural network (e.g., modifying the sampling rate of one or more of the sampling layers).

Further, as used herein, the term "sampling layer" refers to a neural network layer that samples an input to produce an output. In particular, a sampling layer can refer to a neural network layer that implements a function (e.g., a sampling function) to generate an output based on an input. To illustrate, a sampling layer can include, but is not limited to, an up-sampling layer, a down-sampling layer, or an identity layer.

As used herein, the term "up-sampling layer" refers to a sampling layer that generates an output (e.g., a feature map) having a size that is larger than the size of the input to the sampling layer. In particular, an up-sampling layer can implement a sampling function (e.g., an up-sampling function) that increases the size of the input. Similarly, as used herein the term "down-sampling layer" refers to a sampling layer that generates an output having a size that is smaller than the size of the input to the sampling layer. In particular, a down-sampling layer can implement a sampling function (e.g., a down-sampling function) that reduces the size of the input. As an example, a down-sampling layer can include a pooling layer, such as a max pooling layer. Further, as used herein, the term "identity layer" refers to a sampling layer that provides an output that is equal to the input. In particular, an identity layer can implement a sampling function (e.g., an identity function) that returns the same value that was used as its argument (e.g., returns the input as the output). In one or more embodiments, a sampling layer can include a neural network layer that generates an output having a size that is equal to the size of the input but values that differ from those of the input.

Additionally, as used herein, the term "sampling rate" refers to a frequency of sampling input. In particular, a sampling rate can refer to a value associated with a sampling layer that controls how the sampling layer samples input to provide an output. To illustrate, a sampling rate that is less than one can correspond to down-sampling, and a sampling rate that is greater than one can correspond to up-sampling.

Further, as used herein, the term "network weight" refers to a parameter of a neural network. For instance, each neuron (i.e., channel) can compute an output value by applying a function to values provided as inputs, where the function is determined by a vector of network weights. Through training (e.g., backpropagation), the neural network can tune and learn optimal network weights associated with each of the channels (e.g., channel network weights) and/or layers (e.g., layer network weights) to enable the neural network to output accurate predictions.

Additionally, as used herein, the term "feature map" refers to a collection of one or more feature values. In particular, a feature map can refer to a grid, a matrix, a vector, or a different multi-dimensional collection of feature values. To illustrate, a feature map can include a set of feature values corresponding to latent and/or patent attributes and characteristics related to input to a neural network. More specifically, a neural network layer can generate a feature map (referred to as an output feature map); accordingly, the feature map can include a set of feature values corresponding to latent and/or patent attributes and characteristics related to the input of that neural network layer. Relatedly, as used herein, the term "interpolated feature map" refers to a feature map generated by an interpolation layer of a neural network.

In one or more embodiments, a feature map is associated with a size. As used herein, the term "size of a feature map" (or "size") refers to a dimensional characteristic of a feature map. In particular, a size of a feature map can refer to the spatial scope (e.g., digital or physical). To illustrate, the size of a feature map can refer to the height and width of the feature map. But the size of a feature map can additionally include other dimensional metrics as well, such as a number of channels or depth.

Further, as used herein, the term "neural network shaping mechanism" (or "shaping mechanism") refers to a neural network component used to adjust the shape of a neural network layer. In particular, a neural network shaping mechanism can refer to a component associated with a particular sampling layer of a neural network and used to modify the shape of that sampling layer. For example, a neural network shaping mechanism can include a neural network component used to modify a sampling rate of the associated sampling layer. More detail regarding the neural network shaping mechanism will be provided in the disclosure below.

In one or more embodiments, a neural network shaping mechanism is associated with a learnable scaling factor. As used herein, the term "learnable scaling factor" (or "scaling factor") refers to a learnable parameter of a neural network shaping mechanism. In particular, a learnable scaling factor refers to a value or set of values that can be iteratively adjusted based on analysis of a dataset. In one or more embodiments, the neural architecture shaping system shapes the architecture of a neural network based on the learned scaling factor of an associated neural network shaping mechanism.

In some embodiments, a neural network shaping mechanism includes an interpolation layer. As used herein, the term "interpolation layer" refers to a neural network layer that performs an interpolation operation. In particular, an interpolation layer can refer to a neural network layer that implements a function that performs an interpolation based on input to a neural network shaping mechanism. To illustrate, an interpolation layer can perform an interpolation between values (e.g., feature maps) that have been generated by different branches of a neural network shaping mechanism based on input to the neural network shaping mechanism.

As used herein, the term "dataset" refers to a set of digital data. In particular, a dataset can refer to a set of digital data used to learn the weight(s) of a neural network and/or the parameter(s) of a neural network shaping mechanism—such as a scaling factor. In one or more embodiments, a dataset includes digital data that shares one or more common characteristics. For example, a dataset can include digital data that is related to a particular task to be performed by a neural network, such as classifying an object in a digital image or providing a prediction based on a known or unknown sequence.

Additional detail regarding the neural architecture shaping system will now be provided with reference to the figures. For example, FIG. 1 illustrates a schematic diagram of an exemplary system 100 in which a neural architecture shaping system 106 can be implemented. As illustrated in FIG. 1, the system 100 can include a server(s) 102, a network 108, and client devices 110a-110n.

Although the system 100 of FIG. 1 is depicted as having a particular number of components, the system 100 can have any number of additional or alternative components (e.g., any number of servers, client devices, or other components in communication with the neural architecture shaping system 106 via the network 108). Similarly, although FIG. 1 illustrates a particular arrangement of the server(s) 102, the network 108, and the client devices 110a-110n, various additional arrangements are possible.

The server(s) 102, the network 108, and the client devices 110a-110n may be communicatively coupled with each other either directly or indirectly (e.g., through the network 108 discussed in greater detail below in relation to FIG. 9). Moreover, the server(s) 102 and the client devices 110a-110n may include a variety of computing devices (including one or more computing devices as discussed in greater detail with relation to FIG. 9).

As mentioned above, the system 100 includes the server(s) 102. The server(s) 102 can generate, store, receive, and/or transmit data, including data used for shaping neural network architectures. For example, the server(s) 102 can receive, from a client device (e.g., one of the client devices 110a-110n), a dataset or access to a dataset corresponding to a task for a neural network to perform. In one or more embodiments, the server(s) 102 comprises a data server. The server(s) 102 can also comprise a communication server or a web-hosting server.

As shown in FIG. 1, the server(s) 102 can include a machine learning system 104. In particular, the machine learning system 104 can initialize, train, and/or implement machine learning models, such as neural networks. For example, the machine learning system 104 can access a dataset and train a neural network using the dataset. The machine learning system 104 can further utilize the trained neural network to perform a task, such as a task that corresponds to the dataset used for training.

Additionally, the server(s) 102 include the neural architecture shaping system 106. In particular, in one or more embodiments, the neural architecture shaping system 106 utilizes the server(s) 102 to shape neural network architectures. For example, the neural architecture shaping system 106 can utilize the server(s) 102 to initialize a neural network that includes a plurality of sampling layers and then modify the architecture of the neural network by modifying a sampling rate of one or more of the sampling layers.

For example, in one or more embodiments, the neural architecture shaping system 106, via the server(s) 102, initializes a neural network that includes a plurality of sampling layers and a plurality of neural network weights. The neural architecture shaping system 106 can, via the server(s) 102, provide a neural network shaping mechanism for at least one sampling layer of the neural network. In particular, the neural network shaping mechanism can include a learnable scaling factor between a sampling rate of the at least one sampling layer and an additional sampling function based on input to the at least one sampling layer. Via the server(s) 102, the neural architecture shaping system 106 can jointly learn the scaling factor and the plurality of network weights based on a dataset. The neural architecture shaping system 106 can further, via the server(s) 102, shape an architecture of the neural network by modifying the sampling rate.

In one or more embodiments, the client devices 110a-110n include computing devices that can utilize neural networks having an architecture that has been shaped using a neural network shaping mechanism. For example, the client devices 110a-110n can include smartphones, tablets, desktop computers, laptop computers, head-mounted-display devices, or other electronic devices. The client devices 110a-110n can include one or more applications (e.g., the client application 112) that can utilize neural networks having an architecture that has been shaped using a neural network shaping mechanism. For example, the client application 112 can include a software application installed on the client devices 110a-110n. Additionally, or alternatively, the client application 112 can include a software application hosted on the server(s) 102, which may be accessed by the client devices 110a-110n through another application, such as a web browser.

The neural architecture shaping system 106 can be implemented in whole, or in part, by the individual elements of the system 100. Indeed, although FIG. 1 illustrates the neural architecture shaping system 106 implemented with regard to the server(s) 102, different components of the neural architecture shaping system 106 can be implemented in a variety of components of the system 100. For example, one or more components of the neural architecture shaping system 106—including all components of the neural architecture shaping system 106—can be implemented by a separate server from the server(s) 102 hosting the machine learning system 104. Example components of the neural architecture shaping system 106 will be discussed in more detail below with regard to FIG. 7.

Figure 2:
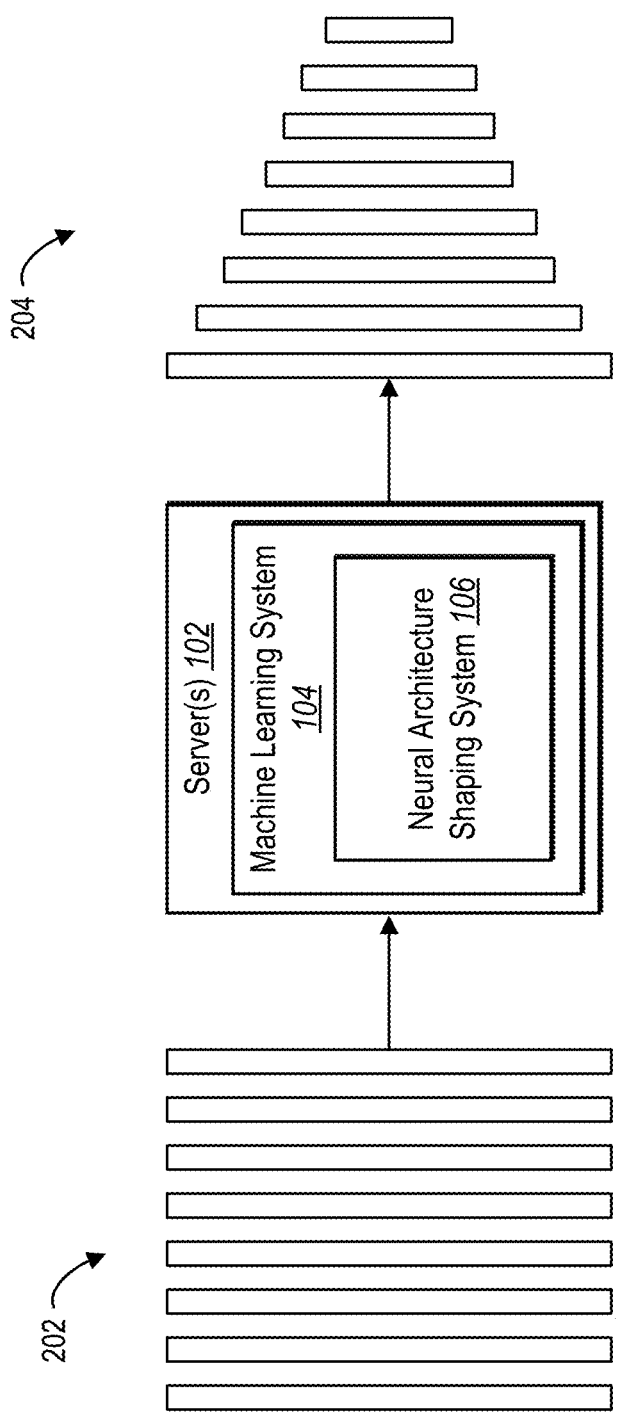
FIG. 2 illustrates an overview diagram of the neural architecture shaping system shaping the architecture of a neural network in accordance with one or more embodiments.

As mentioned above, the neural architecture shaping system 106 can shape the architecture of a neural network FIG. 2 illustrates an overview diagram of the neural architecture shaping system 106 shaping the architecture of a neural network in accordance with one or more embodiments.

As shown in FIG. 2, the neural architecture shaping system 106 initializes a neural network 202. The neural network 202 includes one or more sampling layers. Indeed, the neural network 202 can include various numbers of sampling layers. For example, in one or more embodiments, the neural network 202 includes one sampling layer. In some embodiments, however, the neural network 202 includes a plurality of sampling layers. The neural network 202 can include various types of sampling layers as well. In addition to the sampling layers, in one or more embodiments, the neural network 202 also includes a plurality of network weights.

In one or more embodiments, the neural architecture shaping system 106 receives the neural network 202 from an external source, such as a separate server. In some embodiments, the neural architecture shaping system 106 accesses or otherwise retrieves the neural network 202 from a storage device that stores neural networks. In still further embodiments, the neural architecture shaping system 106 generates the neural network 202 for use in shaping the neural network architecture.

In one or more embodiments, the neural architecture shaping system 106 initializes the neural network 202. In some embodiments, the neural architecture shaping system 106 initializes the neural network 202 by initializing the shape of the architecture of the neural network 202. As an example, FIG. 2 illustrates the neural network 202 having an initial shape where the neural network layers all have a particular shape (e.g., a particular width or number of neurons within the neural network layer). This is, however, merely an illustration. The neural architecture shaping system 106 can, in some embodiments, initialize a neural network that has various shapes. The neural architecture shaping system 106 can further initialize a neural network so that the shapes of the neural network layers differ from one another.

Further, in some embodiments, the neural architecture shaping system 106 initializes the neural network 202 by initializing the plurality of network weights of the neural network 202. For example, the neural architecture shaping system 106 can establish an initialized set of values (e.g., default values) for the network weights of the neural network 202.

As shown in FIG. 2, the neural architecture shaping system 106 analyzes the neural network 202 to shape the architecture of the neural network 202 (as shown by the shaped neural network 204). For example, as will be discussed in more detail below with regard to FIG. 3, the neural architecture shaping system 106 can provide a neural network shaping mechanism for at least one sampling layer of the neural network 202. The neural network shaping mechanism can include a learnable scaling factor between a sampling rate of the at least one sampling layer and an additional sampling function that operates based on input to the at least one sampling layer. As will be discussed in more detail below with regard to FIGS. 3-4, the neural architecture shaping system 106 can learn the scaling factor jointly with the network weights of the neural network 202. The neural architecture shaping system 106 can shape the architecture of the neural network 202 based on the learned scaling factor as will be discussed in more detail below with regard to FIG. 5.

As shown in FIG. 2, the neural architecture shaping system 106 shapes the architecture of the neural network 202 by modifying the sampling layers of the neural network 202. Though, FIG. 2 shows the neural architecture shaping system 106 modifying all sampling layers within the neural network 202, in some embodiments, the neural architecture shaping system 106 modifies less than all of the sampling layers of the neural network 202. Indeed, the neural architecture shaping system 106 can modify the sampling layers for which a neural network shaping mechanism has been provided.

Figure 3:
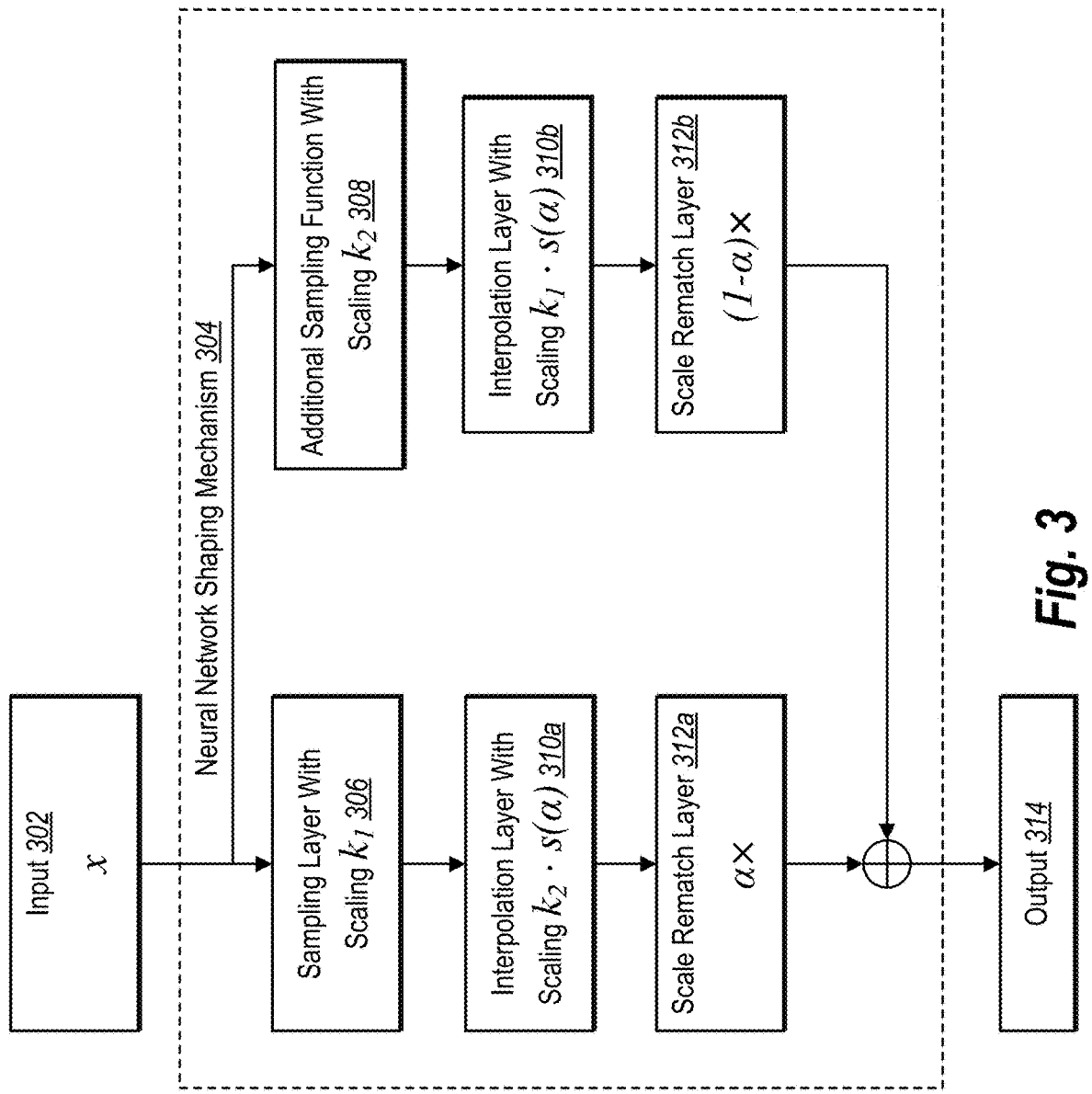
FIG. 3 illustrates a schematic diagram of a neural network shaping mechanism in accordance with one or more embodiments.

As mentioned above, in one or more embodiments, the neural architecture shaping system 106 shapes the architecture of a neural network using a neural network shaping mechanism. Indeed, the neural architecture shaping system 106 can provide a neural network shaping mechanism for one or more sampling layers of the neural network. The neural architecture shaping system 106 can shape the architecture of the neural network based on a learnable scaling factor of the neural network shaping mechanism. FIG. 3 illustrates a schematic diagram of a neural network shaping mechanism 304 in accordance with one or more embodiments.

As shown in FIG. 3, neural network shaping mechanism 304 includes two separate sampling branches: a first sampling branch that includes a sampling layer 306 of the neural network (the entire neural network is not shown); and a second sampling branch that includes the additional sampling function 308. The sampling layer 306 can include one of various types of sampling layers. For example, in one or more embodiments, the sampling layer 306 includes a down-sampling layer, such as a pooling layer (e.g., for max pooling). In some embodiments, the sampling layer 306 includes an up-sampling layer. In further embodiments, the sampling layer 306 includes an identity layer.

Similarly, the additional sampling function 308 can include one of various types of sampling functions. For example, the additional sampling function 308 can include an up-sampling function, a down-sampling function, or an identity function. It should be noted that terms, such as "sampling layer" and "sampling function" are used to differentiate between the sampling layer 306 and the additional sampling function 308. Indeed, in one or more embodiments, the additional sampling function 308 includes a sampling layer that implements a sampling function that is referred to as the additional sampling function 308.

In one or more embodiments, the neural architecture shaping system 106 determines the type of sampling layer for the sampling layer 306 and/or the type of sampling function for the additional sampling function 308 based on sampling factors. For example, the neural architecture shaping system 106 can determine a first sampling factor (labeled "$k_1$") for the sampling layer 306 and can determine the type of sampling layer based on the value of the first sampling factor. To illustrate, in one or more embodiments, the neural architecture shaping system 106 determines that the sampling layer 306 includes a down-sampling layer where $k_1=0.5$ or an up-sampling layer where $k_1=2$. Similarly, the neural architecture shaping system 106 can determine a second sampling factor (labeled "$k_2$") for the additional sampling function 308 and determine the type of sampling function based on the value of the second sampling factor. As an illustration, in one or more embodiments, the neural architecture shaping system 106 determines that the additional sampling function 308 includes an identity function where $k_2=1$.

In one or more embodiments, the neural architecture shaping system 106 determines the first sampling factor for the sampling layer 306 and the second sampling factor for the additional sampling function 308 based on user (e.g., administrator) input. Indeed, in some embodiments, the neural architecture shaping system 106 can receive the first and second sampling factors from a client device associated with a user as parameters for shaping the architecture of the neural network. The neural architecture shaping system 106 can determine the type of sampling layer for the sampling layer 306 and/or the type of sampling function for the additional sampling function 308 based on the received sampling factors.

As further shown in FIG. 3, the neural network shaping mechanism 304 includes the interpolation layers 310*a*-310*b* (which may be collectively referred to as the "interpolation layer"). Further, the neural network shaping mechanism 304 includes the scale rematch layers 312*a*-312*b* (which may be collectively referred to as the "scale rematch layer").

Additionally, the neural network shaping mechanism includes a learnable scaling factor (labeled a'). In particular, the learnable scaling factor includes a value that represents a scaling between a sampling rate of the sampling layer 306 and the additional sampling function 308. The neural architecture shaping system 106 can learn the scaling factor of the neural network shaping mechanism 304 based on the input 302 to the sampling layer 306 (the input being labeled 'x'). For example, in one or more embodiments, the neural architecture shaping system 106 utilizes the neural network to iteratively process data from a dataset. As the neural network processes the data, the neural network shaping mechanism 304 receives the input 302 to the sampling layer 306 (e.g., the input 302 being output from a previous layer of the neural network). Through the iterative processing of the data, the neural architecture shaping system 106 learns the scaling factor by iteratively modifying its value.

To illustrate, in one or more embodiments, the neural architecture shaping system 106 learns the scaling factor of the neural network shaping mechanism 304 using the following:

$$\text{ShapeAdaptor}(x,\alpha)=\alpha \cdot \mathcal{G}(\mathcal{F}_1(x,k_1),k_2 \cdot s(\alpha))+(1-\alpha) \cdot \mathcal{G}(\mathcal{F}_2(x,k_2),k_1 \cdot s(\alpha)) \quad (1)$$

The functions $\mathcal{F}_{1,2}\mathcal{G}(a,b)$ generally represent the sampling functions used in equation 1 with input a and shaping factor b. In one or more embodiments, the shaping factor includes a continuous mapping from the learnable scaling factor. Additionally, in equation 1, $\alpha \in (0,1)$. In some embodiments, the neural architecture shaping system 106 parameterizes the scaling factor using a sigmoid function. Additionally, in equation 1, $s(\alpha)$ represents a scaling function. In one or more embodiments, to allow the neural network shaping mechanism 304 to re-scale the input x into any reshaping factor in the range $[k_1, k_2]$, the neural architecture shaping system 106 implements the scaling function as a continuous monotonic function. In particular, the neural architecture shaping system 106 can implement the scaling function to as a function that satisfies the following:

$$\lim_{a \to 1} k_2 \cdot s(\alpha) = 1 \text{ and } \lim_{a \to 0} k_1 \cdot s(\alpha) = 1 \quad (2)$$

As an example, in one or more embodiments, the neural architecture shaping system 106 utilizes one of the following as the scaling function:

$$s(\alpha) = \left(\frac{1}{k_2} - \frac{1}{k_1}\right)\alpha + \frac{1}{k_1} \quad (3)$$

$$s(\alpha) = \frac{1}{(k_2 - k_1)a + k_1} \quad (4)$$

To provide an example of using equation 1 to learn the scaling factor, in one or more embodiments, the neural architecture shaping system 106 generates output feature maps based on the input 302 to the sampling layer 306 using the sampling rate of the sampling layer 306 and the additional sampling function 308. To illustrate, for a given iteration, the neural architecture shaping system 106 can generate a first feature map that includes a first size using the sampling rate of the sampling layer 306 based on the input 302. The neural architecture shaping system 106 further generates a second feature map that includes a second size using the additional sampling function 308 based in the input 302. In one or more embodiments (e.g., due to the difference in sampling by the sampling layer 306 and the additional sampling function 308), the first size of the first feature map and the second size of the second feature map are different.

In some embodiments, the neural architecture shaping system 106 utilizes the interpolation layer of the neural network shaping mechanism 304 (i.e., the interpolation layers 310*a*-310*b*) to generate interpolated feature maps based on the output feature maps generated by the sampling layer 306 and the additional sampling function 308. For example, the neural architecture shaping system 106 can utilize the interpolation layer of the neural network shaping mechanism 304 to generate an interpolated feature map (e.g., a third feature map) based on the first feature map generated by the sampling layer 306 and the second feature map generated by the additional sampling function 308. Though referred to as a single feature map, in one or more embodiments, the interpolated feature map includes a first interpolated feature map generated by the interpolation layer 310*a* and a second interpolated feature map generated by the interpolation layer 310*b*.

In one or more embodiments, the interpolated feature map includes a third size that is different than that of the first size of the first feature map or the second size of the second feature map. For example, the neural architecture shaping system 106 can determine the size of the interpolated feature map using an interpolation of the first size of the first feature map and the second size of the second feature map. In some embodiments, however, the size of the interpolated feature map is equal to, or near equal to, the first size of the first feature map or the second size of the second feature map.

As shown in FIG. 3, in one or more embodiments, the neural architecture shaping system 106 provides the scaling function $s(\alpha)$ within the interpolation layer of the neural network shaping mechanism 304. By providing the scaling function within the interpolation layer, the neural architecture shaping system 106 enables equation 1 to be differentiable. Indeed, the reshaping factor in each sampling layer is formulated as a continuous mapping from a learnable scaling factor, thus providing semi-differentiability and can be trained with standard back-propagation. As such, the neural architecture shaping system 106 can use back-propagation and end-to-end optimization techniques to learn the scaling factor(s).

As shown in FIG. 3, the neural architecture shaping system 106 further processes the interpolated feature map using the scale rematch layer of the neural network shaping mechanism (i.e., the scale rematch layers 312a-312b). Indeed, as shown in FIG. 3, the scale rematch layer generates a scaled feature map based on the scaling factor. In particular, the neural architecture shaping system 106 can utilize the scale rematch layer 312a to generate a first scaled feature map (e.g., based on a first interpolated feature map generated by the interpolation layer 310a) and utilize the scale rematch layer 312b to generate a second scaled feature map (e.g., based on a second interpolated feature map generated by the interpolation layer 310b). The neural architecture shaping system 106 can combine the scaled feature maps to generate the output 314 of the neural network shaping mechanism 304.

Figure 4:
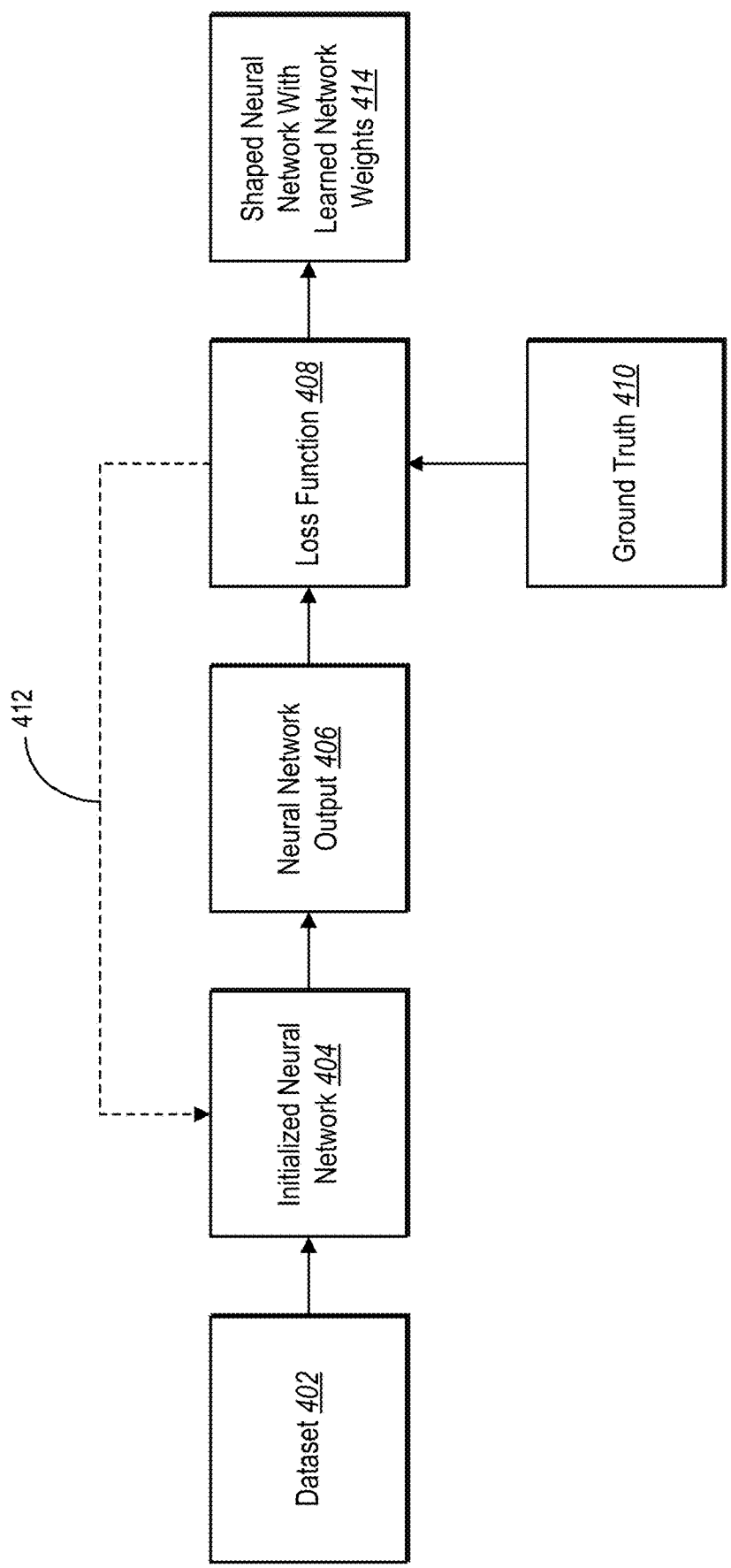
FIG. 4 illustrates a block diagram of the neural architecture shaping system jointly learning a scaling factor and network weights of a neural network in accordance with one or more embodiments.

As previously mentioned, in one or more embodiments, the neural architecture shaping system 106 learns the scaling factor(s) of a neural network shaping mechanism jointly with the network weights of the neural network. FIG. 4 illustrates a block diagram of the neural architecture shaping system 106 jointly learning the scaling factor of a neural network shaping mechanism and the network weights of a neural network in accordance with one or more embodiments.

As shown in FIG. 4, the neural architecture shaping system 106 learns the scaling factor and the network weights by providing a dataset 402 to an initialized neural network 404. In particular, the dataset 402 includes data used to learn the scaling factor and the network weights.

In one or more embodiments, the dataset 402 corresponds to a particular task for a neural network to perform; accordingly, the neural architecture shaping system 106 learns values for the scaling factor and the network weights/parameters that allow the neural network to effectively perform the task.

As shown in FIG. 4, the neural architecture shaping system 106 utilizes the initialized neural network 404 to generate neural network output 406 based on data from the dataset 402. The neural architecture shaping system 106 can utilize the loss function 408 to determine the loss (i.e., error) resulting from the initialized neural network 404 by comparing the neural network output 406 with a ground truth 410. The neural architecture shaping system 106 can back propagate the determined loss to the initialized neural network 404 (as indicated by the dashed line 412) to optimize the model by updating its network weights as well as the scaling factor of associated neural network shaping mechanisms. As shown by the description in relation to FIGS. 3 and 4, the neural network shaping mechanisms are built on top of two existing sampling layers and conditioned on in-coming feature maps only, with no additional supervision.

Thus, the neural architecture shaping system 106 can iteratively utilize the initialized neural network 404 to analyze data from the dataset 402, determine the resulting loss using the loss function 408, back propagating the determined loss to update the network weights and scaling factor(s) in order to gradually improve the accuracy with which the initialized neural network 404 can perform a desired task (e.g., the task corresponding to the dataset 402). Further, as will be discussed in more detail below with regard to FIG. 5, the neural architecture shaping system 106 can utilize the learned scaling factor(s) to shape the initialized neural network 404 (e.g., by shaping the sampling layer(s) associated with the provided neural network shaping mechanism(s)). As shown, the neural architecture shaping system 106 can thus generate the shaped neural network with learned network weights 414.

Thus, the neural architecture shaping system 106 can learn scaling factors for neural network shaping mechanisms associated with sampling layers of a neural network. Indeed, as discussed above, the neural architecture shaping system 106 can provide a neural network shaping mechanism for one or more sampling layers of a neural network. The neural architecture shaping system 106 can learn the scaling factors in order to shape the architecture of the neural network. The algorithm and acts described with reference to FIGS. 3-4 can comprise the corresponding structure for performing a step for learning scaling factors for the one or more neural network shaping mechanisms. Additionally, architecture of a neural network shaping mechanism described with reference to FIG. 3 can comprise the corresponding structure for performing a step for learning scaling factors for the one or more neural network shaping mechanisms. As further discussed above, in one or more embodiments, the neural architecture shaping system 106 learns the scaling factors for the neural network shaping mechanisms while jointly learning the network weights of the neural network.

By learning the scaling factor for the neural network shaping mechanism jointly with the network weights of the neural network and shaping the neural network architecture based on the scaling, the neural architecture shaping system 106 can operate more efficiently than conventional systems. Indeed, by searching for the structure of a neural network in this manner, the neural architecture shaping system 106 can more efficiently learn the optimal structure of a neural network for a given task. For example, the structure searching of the neural architecture shaping system 106 can operate more efficiently than conventional systems utilizing an NAS algorithm to discover optimal operations within a fixed structure, which can require significant computing resources (e.g., equivalent to training a large number of neural networks in parallel) in order to learn those operations. Accordingly, the neural architecture shaping system 106 can reduce the computational power required for learning the neural network architecture.

Figure 5:
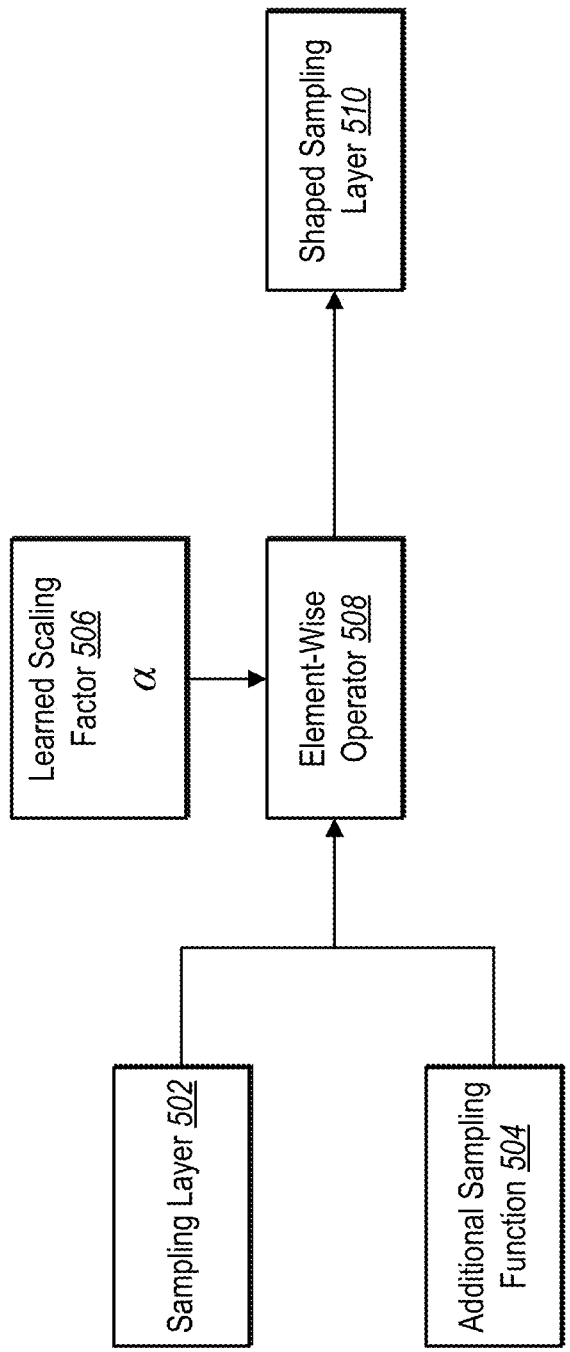
FIG. 5 illustrates a block diagram of the neural architecture shaping system shaping a sampling layer of a neural network in accordance with one or more embodiments.

As mentioned above, in one or more embodiments, the neural architecture shaping system 106 shapes a sampling layer of a neural network based on a learned scaling factor of a neural network shaping mechanism provided for that sampling layer. FIG. 5 illustrates a block diagram of the neural architecture shaping system 106 shaping a sampling layer of a neural network in accordance with one or more embodiments.

In one or more embodiments, the neural architecture shaping system 106 shapes a sampling layer by modifying the sampling rate of the sampling layer based on a learned scaling factor of a neural network shaping mechanism provided for the sampling layer. For example, as shown in FIG. 5, in some embodiments, the neural architecture shaping system 106 modifies the sampling rate of the sampling layer 502 by combining the sampling layer 502 and the additional sampling function 504 associated with the provided neural network shaping mechanism into the shaped sampling layer 510.

In particular, the neural architecture shaping system 106 can combine the sampling layer 502 and the additional sampling function 504 using the element-wise operator 508. In other words, the neural architecture shaping system 106 can combine the two sampling branches of the neural network shaping mechanism into one sampling branch—the shaped sampling layer 510. In one or more embodiments, the neural architecture shaping system 106 uses the element-wise operator 508 to element-wise combine parameters associated with the sampling layer 502 and parameters associated with the additional sampling function 504 into the shaped sampling layer 510. In one or more embodiments, the element-wise operate 508 includes an element-wise addition operator that combines the sampling layer 502 and the additional sampling function 504 via element-wise addition.

As further shown in FIG. 5, the neural architecture shaping system 106 modifies the sampling rate of the sampling layer 502 based on the learned scaling factor 506 of the associated neural network shaping mechanism. In particular, the neural architecture shaping system 106 can combine the sampling layer 502 and the additional sampling function 504 based on the learned scaling factor 506. Thus, in one or more embodiments, the shaped sampling layer 510 will include a sampling layer that up-samples or down-samples using a sampling rate determined based on the learned scaling factor 506. For example, in one or more embodiments, the neural architecture shaping system 106 can modify the sampling rate of the sampling layer to have various values between 0.5 and 1 for down-sampling or various values between 1 and 2 for up-sampling.

By shaping the architecture of a neural network via modification of the sampling rate of at least one sampling layer, the neural architecture shaping system 106 can operate more flexibly than conventional systems. In particular, by shaping the architecture of a neural network using a scaling factor learned based on a dataset, the neural architecture shaping system 106 can flexibly adapt the shape of the neural network to effectively perform a desired task. Indeed, as mentioned, the dataset used in learning the scaling factor can correspond to a particular task. Therefore, by analyzing data from the dataset, the neural architecture shaping system 106 can learn a value for the scaling factor that will allow the neural network to effectively perform the task. Accordingly, the neural architecture shaping system 106 can flexibly optimize the structure of the neural network for the task.

Further, by shaping the architecture of the neural network based on a learned scaling factor, the neural architecture shaping system 106 can operate more accurately than conventional systems. Indeed, by relying on a learned scaling factor to adapt the architecture of a neural network to a desired task, the neural architecture shaping system 106 avoids the human-selected neural network structures that are relied upon by many conventional systems. Consequently, the neural architecture shaping system 106 can design neural network architectures that will more perform a desired task with more accurate results.

Figure 6A:
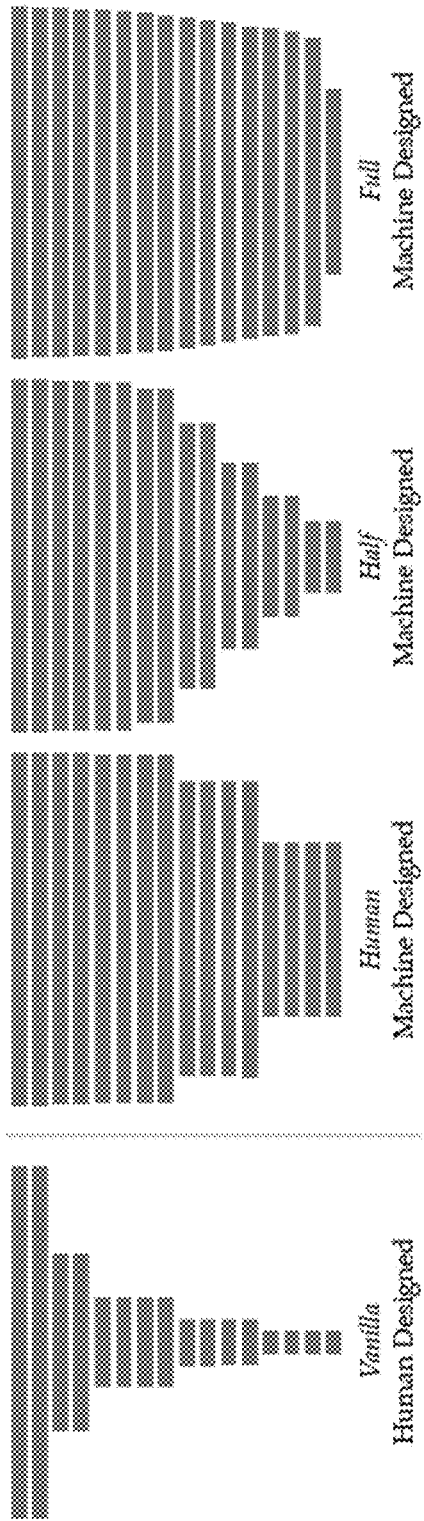
FIG. 6A illustrates a diagram of neural networks that have been shaped by the neural architecture shaping system in accordance with one or more embodiments.
Figure 6B:
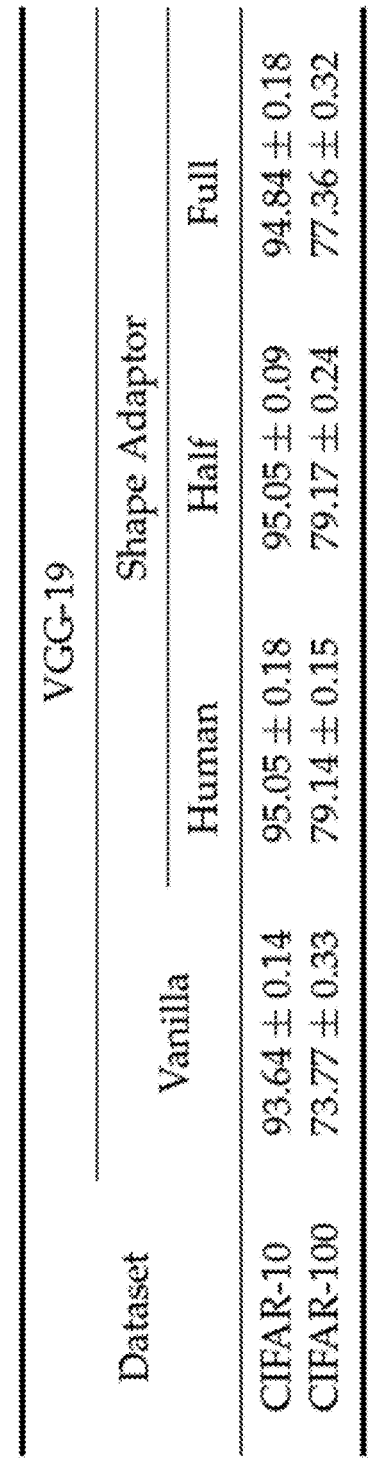
FIG. 6B illustrates a table reflecting experimental results regarding the effectiveness of the shaped neural networks of FIG. 6A in accordance with one or more embodiments.

As just mentioned, shaping a neural network based on a learned scaling factor can allow the neural architecture shaping system 106 to generate a neural network that more accurately performs a desired task. Researchers have conducted studies to determine the accuracy of multiple embodiments of a shaped neural network in performing a task. FIG. 6A illustrates a diagram of neural networks that have been shaped by the neural architecture shaping system 106 in accordance with one or more embodiments. FIG. 6B illustrates a table reflecting experimental results regarding the effectiveness of the shaped neural networks of FIG. 6A in performing a task in accordance with one or more embodiments.

As shown in FIG. 6A, the researchers measured the performance of three neural networks (i.e., VGG-19 networks) shaped by the neural architecture shaping system 106 using one or more neural network shaping mechanisms. In particular, for the "Human" network, the neural architecture shaping system 106 provided neural network shaping mechanisms for human-selected sampling layers. For the "Half" network, the neural architecture shaping system 106 provided neural network shaping mechanisms every two sampling layers. For the "Full" network, the neural architecture shaping system 106 providing neural network shaping mechanisms for every layer of the network.

As further shown in FIG. 6A, the researchers compared the performance of the shaped neural networks with the performance of the "Vanilla" network. In particular, the "Vanilla" network includes a human-designed VGG-19 network that down-samples by half every few layers. Indeed, the "Vanilla" network down-samples using sampling layers located at portions of the network that correspond to portions of the "Human" network for which neural network shaping mechanisms have been provided.

Additionally, as shown in FIG. 6A, the researchers measured the performance of the shaped neural networks across two datasets. In particular, the CIFAR-10 dataset consists of sixty thousand 32×32 digital color images in ten classes, with six thousand digital images per class. The CIFAR-100 dataset also has sixty thousand 32×32 digital color images but in one hundred classes with six hundred digital images per class. Accordingly, the researchers measured how the shaped neural networks performed in a classification task.

As shown in FIG. 6B, the researchers measured the performance of the shaped neural networks using a metric that indicates accuracy. In particular, a larger value indicates more accurate performance of the corresponding network. As shown, all three shaped neural networks outperformed the "Vanilla" network across both datasets. Notably, the "Half" network performed with the greatest accuracy across both datasets.

Figure 7:
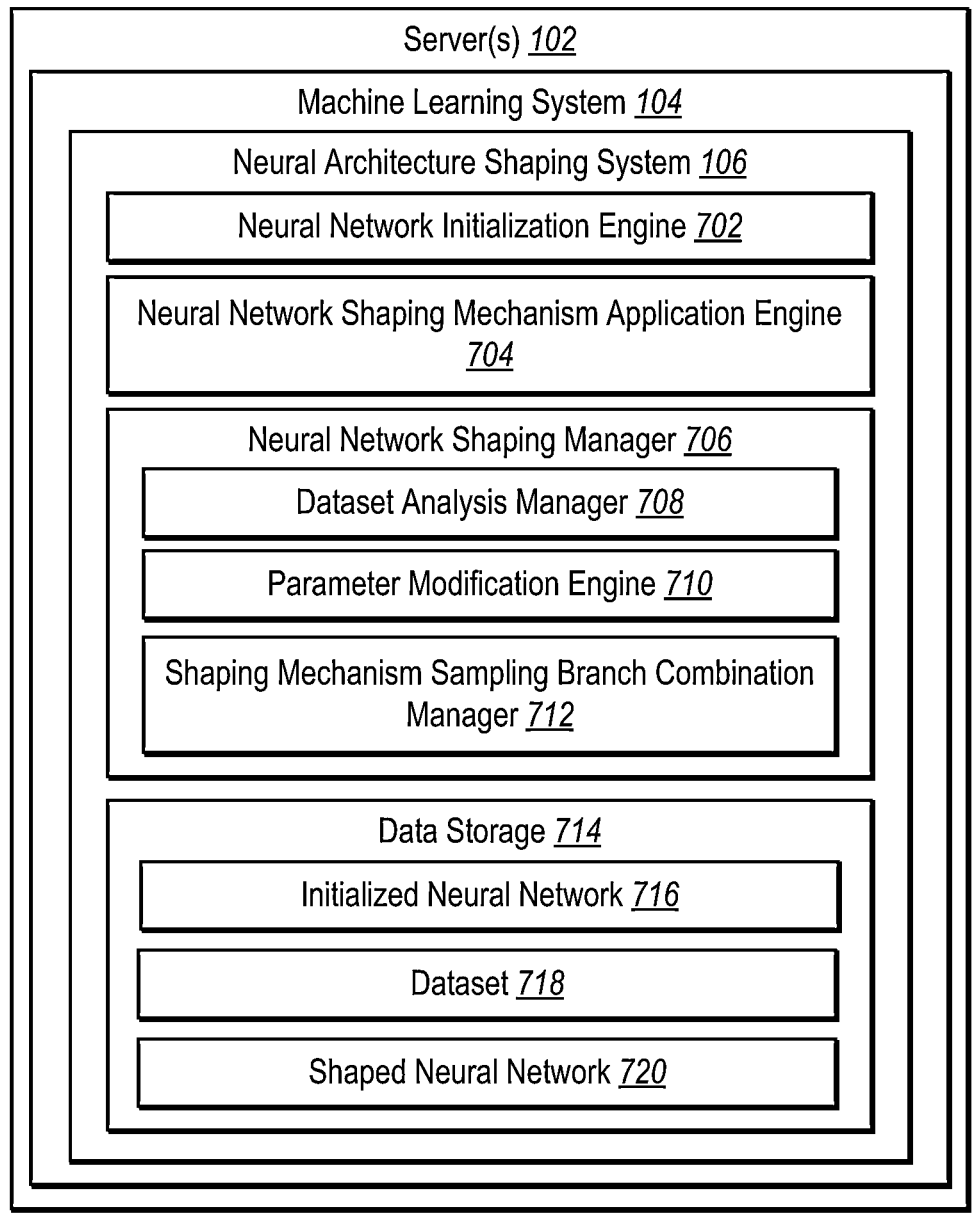
FIG. 7 illustrates a schematic diagram of a neural architecture shaping system in accordance with one or more embodiments.

Turning now to FIG. 7, additional detail will now be provided regarding various components and capabilities of the neural architecture shaping system 106. In particular, FIG. 7 illustrates the neural architecture shaping system 106 implemented by the server(s) 102. Additionally, the neural architecture shaping system 106 is also part of the machine learning system 104. As shown, the neural architecture shaping system 106 can include, but is not limited to, a neural network initialization engine 702, a neural network shaping mechanism application engine 704, a neural network shaping manager 706 (which includes a dataset analysis manager 708, a parameter modification engine 710, and a shaping mechanism sampling branch combination manager 712), and data storage 714 (which includes an initialized neural network 716, dataset 718, and a shaped neural network 720).

As just mentioned, and as illustrated in FIG. 7, the neural architecture shaping system 106 includes the neural network initialization engine 702. In particular, the neural network initialization engine 702 can initialize a neural network, such as a neural network that will be shaped using one or more neural network shaping mechanisms. In one or more embodiments, the neural network initialization engine 702 initializes a neural network by initializing a shape of the neural network. For example, the neural network initialization engine 702 can initialize the sampling rate of the sampling layers of the neural network and/or initialize the plurality of network weights associated with the neural network (e.g., by establishing default values).

Additionally, as shown in FIG. 7, the neural architecture shaping system 106 includes the neural network shaping mechanism application engine 704. In particular, the neural network shaping mechanism application engine 704 can provide a neural network shaping mechanism for one or more sampling layers of a neural network. For example, the neural network shaping mechanism application engine 704 can generate two sampling branches where one sampling branch includes the sampling layer of the neural network and the other sampling branch includes an additional sampling function. The neural network shaping mechanism application engine 704 can further provide, within the sampling branches, an interpolation layer and a scale rematch layer that facilitate the learning of a scaling factor.

As shown in FIG. 7, the neural architecture shaping system 106 further includes the neural network shaping manager 706. In particular, the neural network shaping manager 706 includes the dataset analysis manager 708, the parameter modification engine 710, and the shaping mechanism sampling branch combination manager 712. The dataset analysis manager 708 can utilize the neural network initialized by the neural network initialization engine 702 to iteratively analyze data from a dataset. The parameter modification engine 710 can iteratively modify parameters of the initialized neural network (e.g., the scaling factor of provided neural network shaping mechanisms and/or the network weights of the initialized neural network) based on the iterative analysis of data from the dataset by the dataset analysis manager 708. For example, the parameter modification engine 710 can compare output generated by the initialized neural network to a loss function and back propagate the determined loss to update the parameters of the initialized neural network. The shaping mechanism sampling branch combination manager 712 can modify the sampling rate of sampling layers for which a neural network shaping mechanism has been provided based on the associated scaling factor learned by the parameter modification engine 710. For example, for a given sampling layer, the shaping mechanism sampling branch combination manager 712 can modify the sampling layer by combining the sampling branches of the associated neural network shaping mechanism (e.g., by combining parameters of the sampling branches via element-wise addition).

Further, as shown in FIG. 7, the neural architecture shaping system 106 includes data storage 714. In particular, data storage 714 includes the initialized neural network 716, the dataset 718, and the shaped neural network 720. The initialized neural network 716 can store the neural network initialized by the neural network initialization engine 702. The dataset 718 can include the dataset utilized by the neural network shaping manager 706 in learning the scaling factor of the neural network shaping mechanism provided for one or more sampling layers of the initialized neural network. The shaped neural network 720 can include the neural network shaped by the neural network shaping manager 706. For example, the shaped neural network 720 can include a neural network having a sampling rate for one or more of the included sampling layers modified (e.g., by combining the sampling branches of the associated neural network shaping mechanism).

Each of the components 702-720 of the neural architecture shaping system 106 can include software, hardware, or both. For example, the components 702-720 can include one or more instructions stored on a computer-readable storage medium and executable by processors of one or more computing devices, such as a client device or server device. When executed by the one or more processors, the computer-executable instructions of the neural architecture shaping system 106 can cause the computing device(s) to perform the methods described herein. Alternatively, the components 702-720 can include hardware, such as a special-purpose processing device to perform a certain function or group of functions. Alternatively, the components 702-720 of the neural architecture shaping system 106 can include a combination of computer-executable instructions and hardware.

Furthermore, the components 702-720 of the neural architecture shaping system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-720 of the neural architecture shaping system 106 may be implemented as a stand-alone application, such as a desktop or mobile application. Furthermore, the components 702-720 of the neural architecture shaping system 106 may be implemented as one or more web-based applications hosted on a remote server. Alternatively, or additionally, the components 702-720 of the neural architecture shaping system 106 may be implemented in a suite of mobile device applications or "apps." For example, in one or more embodiments, the neural architecture shaping system 106 can comprise or operate in connection with digital software applications such as ADOBE® SENSEI® or ADOBE® ANALYTICS CLOUD. "ADOBE," "SENSEI," and "ANALYTICS CLOUD" are either registered trademarks or trademarks of Adobe Inc. in the United States and/or other countries.

Figure 8:
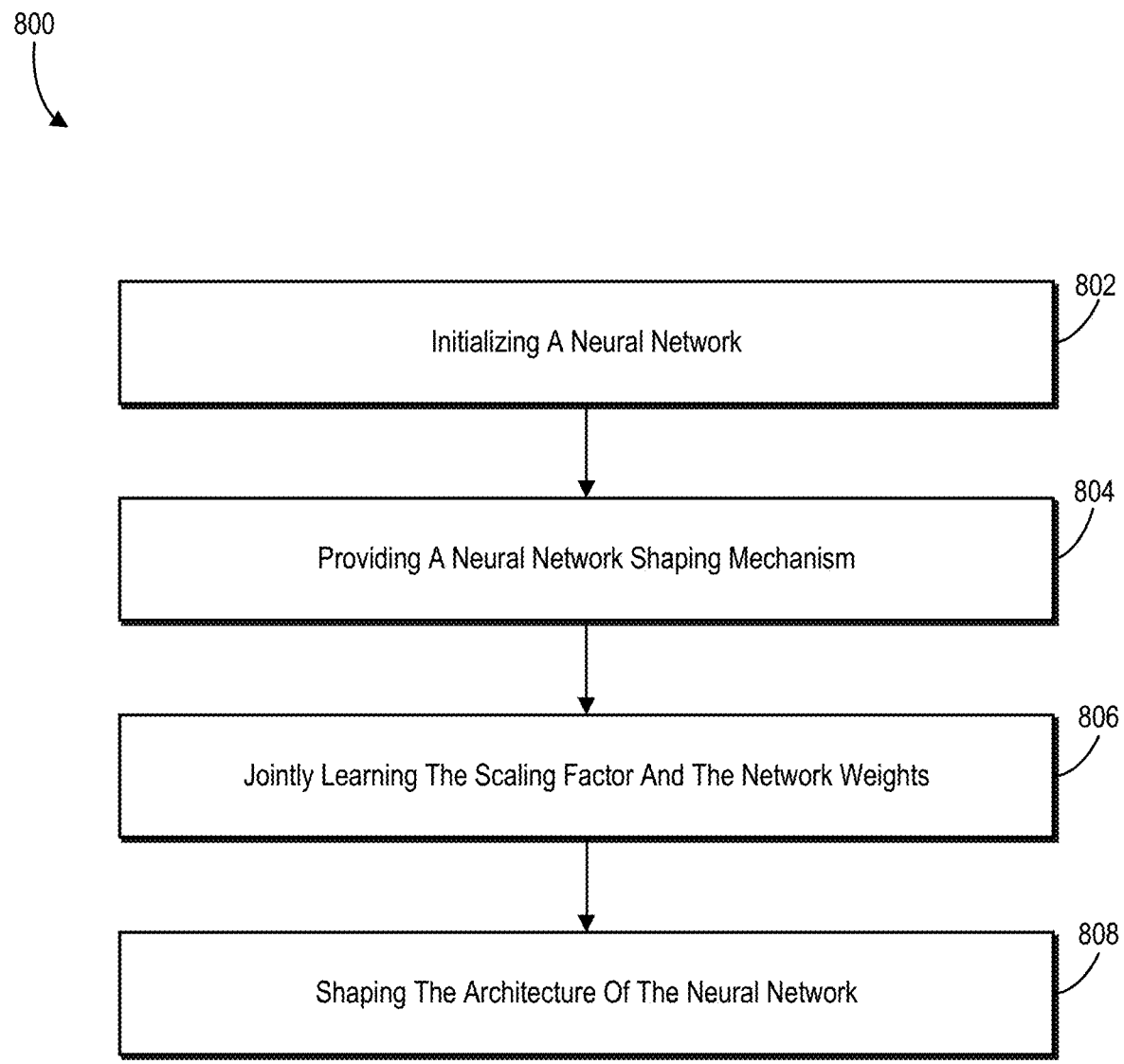
FIG. 8 illustrates a flowchart of a series of acts for shaping the architecture of a neural network in accordance with one or more embodiments.

FIGS. 1-7, the corresponding text and the examples provide a number of different methods, systems, devices, and non-transitory computer-readable media of the neural architecture shaping system 106. In addition to the foregoing, one or more embodiments can also be described in terms of flowcharts comprising acts for accomplishing the particular result, as shown in FIG. 8. FIG. 8 may be performed with more or fewer acts. Further, the acts may be performed in different orders. Additionally, the acts described herein may be repeated or performed in parallel with one another or in parallel with different instances of the same or similar acts.

As mentioned, FIG. 8 illustrates a flowchart of a series of acts 800 for shaping the architecture of a neural network in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. For example, in some embodiments, the acts of FIG. 8 can be performed as part of a computer-implemented method for morphing neural network architectures. Alternatively, a non-transitory computer-readable medium can store instructions thereon that, when executed by at least one processor, cause a computing device to perform the acts of FIG. 8. In some embodiments, a system can perform the acts of FIG. 8. For example, in one or more embodiments, a system includes at least one memory device comprising a neural network comprising a plurality of sampling layers and a plurality of network weights. The system can further include at least one server device configured to cause the system to perform the acts of FIG. 8.

The series of acts 800 includes an act 802 of initializing a neural network. For example, the act 802 involves initializing a neural network comprising a plurality of sampling layers and a plurality of network weights.

The series of acts 800 also includes an act 804 of providing a neural network shaping mechanism. For example, the act 804 involves providing a neural network shaping mechanism for at least one sampling layer of the neural network, the neural network shaping mechanism comprising a learnable scaling factor between a sampling rate of the at least one sampling layer and an additional sampling function. In particular, the neural network shaping mechanism can include a learnable scaling factor between a sampling rate of the at least one sampling layer and an additional sampling function based on input to the at least one sampling layer.

Generally, the neural architecture shaping system 106 can provide one or more neural network shaping mechanisms between sampling layers of the neural network. In some embodiments, each neural network shaping mechanism from the one or more neural network shaping mechanisms comprise a learnable scaling factor between a sampling rate of a sampling layer and an additional sampling function based on input to the sampling layer. To illustrate, in one or more embodiments, the neural architecture shaping system 106 provides the neural network shaping mechanism for the at least one sampling layer of the neural network by providing a plurality of neural network shaping mechanisms for a plurality of sampling layers of the neural network, the plurality of neural network shaping mechanisms comprising learnable scaling factors between sampling rates of the plurality of sampling layers and additional sampling functions based on input to the plurality of sampling layers.

In one or more embodiments, the additional sampling function comprises an identity function. In some embodiments, the at least one sampling layer comprises an up-sampling layer.

Indeed, at least one sampling layer from the sampling layers of the neural network can include an up-sampling layer. In still further embodiments, the at least one sampling layer comprises a down-sampling layer (e.g., a pooling layer). Indeed, at least one sampling layer from the sampling layers of the neural network can include a pooling layer.

The series of acts 800 further includes an act 806 of jointly learning the scaling factor and the network weights. For example, the act 806 involves jointly learn the scaling factor and the plurality of network weights based on a dataset. To illustrate, in one or more embodiments, the neural architecture shaping system 106 generates output feature maps based on input to the at least one sampling layer using the sampling rate of the at least one sampling layer and the additional sampling function and learns (e.g., jointly) the scaling factor and the plurality of network weights based on the output feature maps.

In one or more embodiments, the neural architecture shaping system 106 determines a first sampling factor for the at least one sampling layer and a second sampling factor for the additional sampling function; and generates the output feature maps further based on the first sampling factor and the second sampling factor. In some embodiments, the neural architecture shaping system 106 determines that the at least one sampling layer comprises either an up-sampling layer or a down-sampling layer based on the first sampling factor. In still further embodiments, the neural architecture shaping system 106 determines that the additional sampling function comprises an identity function based on the second sampling factor.

In one or more embodiments, the neural architecture shaping system 106 learns the scaling factor and the plurality of network weights based on the output feature maps by iteratively modifying the scaling factor and the plurality of network weights based on comparisons of ground truths to neural network outputs generated based on the output feature maps.

As an example, in one or more embodiments, the neural architecture shaping system 106 generates a first feature map comprising a first size using the sampling rate of the at least one sampling layer based on the input to the at least one sampling layer, wherein the input to the at least one sampling layer corresponds to the dataset; and generates a second feature map comprising a second size using the additional sampling function based on the input to the at least one sampling layer, wherein the second size is different from the first size. Accordingly, the neural architecture shaping system 106 can jointly learn the scaling factor and the plurality of network weights by modifying the scaling factor based on the first feature map and the second feature map. In other words, the shape transformation is applied by automatically finding a suitable scaling factor to perform linear interpolation between the first and feature maps.

In one or more embodiments, the neural architecture shaping system 106 further generates, using an interpolation layer of the neural network shaping mechanism, interpolated feature maps based on the output feature maps. Accordingly, the neural architecture shaping system 106 can learn the scaling factor and the plurality of network weights based on the output feature maps by learning the scaling factor and the plurality of network weights based on the interpolated feature maps. To illustrate, in one or more embodiments, the neural architecture shaping system 106 further determines, using an interpolation layer of the neural network shaping mechanism, a third feature map comprising a third size based on the first feature map and the second feature map (e.g., an interpolation between the first and feature maps). In one or more embodiments, the third size of the third feature map is different to the first size of the first feature map and the second size of the second feature map. In one or more embodiments, the neural architecture shaping system provides, within the interpolation layer of the neural network shaping mechanism, a scaling function comprising the scaling factor. In some embodiments, the scaling function comprises a continuous monotonic function.

Additionally, the series of acts 800 includes an act 808 of shaping the architecture of a neural network. For example, the act 808 involves shaping an architecture of the neural network by modifying the sampling rate of the at least one sampling layer of the neural network based on the learned scaling factor. In one or more embodiments, modifying the sampling rate of the at least one sampling layer of the neural network based on the learned scaling factor comprises combining parameters associated with the at least one sampling layer and parameters associated with the additional sampling function via element-wise addition based on the learned scaling factor. To illustrate, in one or more embodiments, the neural architecture shaping system 106 determines a combination (e.g., a combination resulting from element-wise addition) of the sampling rate of the at least one sampling layer and the additional sampling function based on the learned scaling factor; and modifies the sampling rate of the at least one sampling layer based on the combination of the sampling rate of the at least one sampling layer and the additional sampling function. Where multiple neural network shaping mechanisms are provided between sampling layers of the neural network, the neural architecture shaping system 106 can shape the architecture of the neural network based on the learned scaling factors.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may be also practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
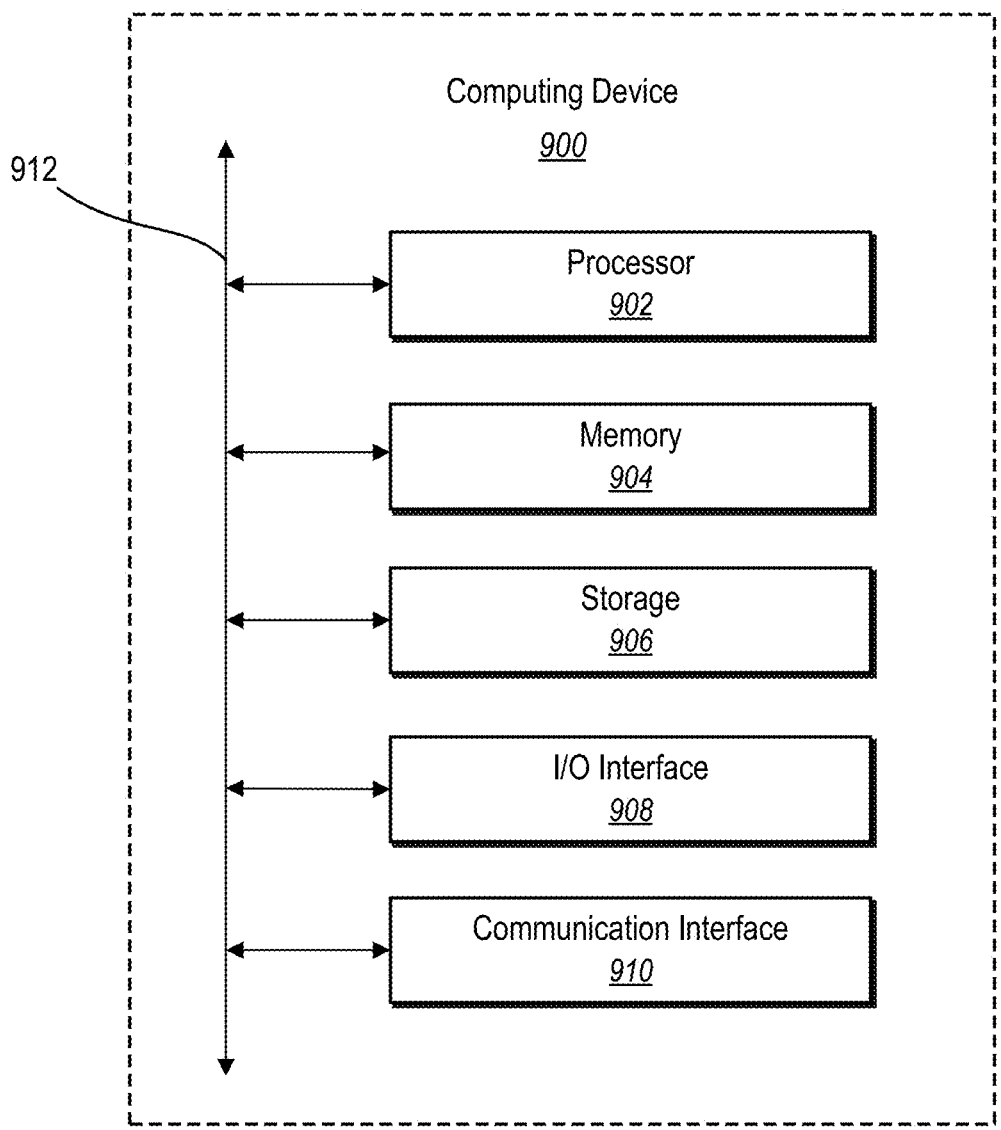
FIG. 9 illustrates a block diagram of an exemplary computing device in accordance with one or more embodiments.

FIG. 9 illustrates a block diagram of an example computing device 900 that may be configured to perform one or more of the processes described above. One will appreciate that one or more computing devices, such as the computing device 900 may represent the computing devices described above (e.g., the server(s) 102 and/or the client devices 110a-110n). In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 including storage for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of computing device 900 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions thereon that, when executed by at least one processor, cause the at least one processor to perform operations comprising:

initializing a neural network comprising a plurality of sampling layers and a plurality of network weights;

providing a neural network shaping mechanism for at least one sampling layer of the neural network, the neural network shaping mechanism comprising a first sampling branch that includes the at least one sampling layer, a second sampling branch that includes an additional sampling function, and a learnable scaling factor between a sampling rate of the at least one sampling layer and the additional sampling function based on input to the at least one sampling layer;

jointly learning the scaling factor and the plurality of network weights using neural network output generated based on a dataset by:

generating a first feature map comprising a first size using the sampling rate of the at least one sampling layer based on the input to the at least one sampling layer, wherein the input to the at least one sampling layer corresponds to the dataset;

generating a second feature map comprising a second size using the additional sampling function based on the input to the at least one sampling layer, wherein the second size is different from the first size; and performing linear interpolation between the first feature map and the second feature map based on the scaling factor; and shaping an architecture of the neural network by combining the first sampling branch and the second sampling branch of the neural network shaping mechanism to modify the sampling rate of the at least one sampling layer of the neural network based on the learned scaling factor.

2. The non-transitory computer-readable medium of claim 1, wherein the additional sampling function comprises an identity function.

3. The non-transitory computer-readable medium of claim 1, further comprising instructions that, when executed by the at least one processor, cause the at least one processor to perform operations comprising determining, using an interpolation layer of the neural network shaping mechanism, a third feature map comprising a third size based on the linear interpolation between the first feature map and the second feature map.

4. The non-transitory computer-readable medium of claim 3, wherein the third size of the third feature map is different from the first size of the first feature map and the second size of the second feature map.

5. The non-transitory computer-readable medium of claim 3, further comprising instructions that, when executed by the at least one processor, cause the at least one processor to perform operations comprising providing, within the interpolation layer of the neural network shaping mechanism, a scaling function comprising the scaling factor.

6. The non-transitory computer-readable medium of claim 5, wherein the scaling function comprises a continuous monotonic function.

7. The non-transitory computer-readable medium of claim 1, wherein combining the first sampling branch and the second sampling branch of the neural network shaping mechanism to modify the sampling rate of the at least one sampling layer of the neural network based on the learned scaling factor comprises combining parameters associated with the at least one sampling layer and parameters associated with the additional sampling function via element-wise addition based on the learned scaling factor.

8. The non-transitory computer-readable medium of claim 1, wherein providing the neural network shaping mechanism for the at least one sampling layer of the neural network comprises providing a plurality of neural network shaping mechanisms for the plurality of sampling layers of the neural network, the plurality of neural network shaping mechanisms comprising learnable scaling factors between sampling rates of the plurality of sampling layers and additional sampling functions based on input to the plurality of sampling layers.

9. A system comprising:
at least one memory device comprising a neural network comprising a plurality of sampling layers and a plurality of network weights; and
at least one server device configured to cause the system to:
provide a neural network shaping mechanism for at least one sampling layer of the neural network, the neural network shaping mechanism comprising a first sampling branch that includes the at least one sampling layer, a second sampling branch that includes an additional sampling function, and a learnable scaling factor between a sampling rate of the at least one sampling layer and the additional sampling function;
generate a first feature map comprising a first size using the sampling rate of the at least one sampling layer based on input to the at least one sampling layer, wherein the input to the at least one sampling layer corresponds to a dataset;
generate a second feature map comprising a second size using the additional sampling function based on the input to the at least one sampling layer, wherein the second size is different from the first size;
determine an interpolation between the first feature map and the second feature map based on the scaling factor;
learn the scaling factor based on the interpolation between the first feature map and the second feature map while jointly learning the plurality of network weights; and
combine the first sampling branch and the second sampling branch of the neural network shaping mechanism to modify the sampling rate of the at least one sampling layer based on the learned scaling factor.

10. The system of claim 9, wherein the at least one server device is further configured to cause the system to learn the scaling factor while jointly learning the plurality of network weights by iteratively modifying the scaling factor and the plurality of network weights based on a loss function.

11. The system of claim 9, wherein the at least one server device is configured to cause the system to:
determine a first sampling factor for the at least one sampling layer and a second sampling factor for the additional sampling function; and
generate the first feature map and the second feature map further based on the first sampling factor and the second sampling factor.

12. The system of claim 11, wherein the at least one server device is configured to cause the system to determine that the at least one sampling layer comprises either an up-sampling layer or a down-sampling layer based on the first sampling factor.

13. The system of claim 11, wherein the at least one server device is configured to cause the system to determine that the additional sampling function comprises an identity function based on the second sampling factor.

14. The system of claim 9, wherein the at least one server device is configured to cause the system to:
determine the interpolation between the first feature map and the second feature map by generating, using an interpolation layer of the neural network shaping mechanism, interpolated feature maps based on the first feature map and the second feature map; and
learn the scaling factor and the plurality of network weights based on the interpolation between the first feature map and the second feature map by learning the scaling factor and the plurality of network weights based on the interpolated feature maps.

15. The system of claim 14, wherein the at least one server device is configured to cause the system to provide, within the interpolation layer of the neural network shaping mechanism, a scaling function comprising the scaling factor.

16. A computer-implemented method for morphing neural network architectures comprising:
initializing a neural network comprising a plurality of sampling layers and a plurality of network weights;
providing a neural network shaping mechanism for at least one sampling layer of the neural network, the neural network shaping mechanism comprising a first sampling branch that includes the at least one sampling layer, a second sampling branch that includes an additional sampling function, and a learnable scaling factor between a sampling rate of the at least one sampling layer and the additional sampling function based on input to the at least one sampling layer;
jointly learning the scaling factor and the plurality of network weights using neural network output generated based on a dataset by:

generating a first feature map comprising a first size using the sampling rate of the at least one sampling layer based on the input to the at least one sampling layer, wherein the input to the at least one sampling layer corresponds to the dataset;

generating a second feature map comprising a second size using the additional sampling function based on the input to the at least one sampling layer, wherein the second size is different from the first size; and performing linear interpolation between the first feature map and the second feature map based on the scaling factor; and shaping an architecture of the neural network by combining the first sampling branch and the second sampling branch of the neural network shaping mechanism to modify the sampling rate of the at least one sampling layer of the neural network based on the learned scaling factor.

17. The computer-implemented method of claim 16, wherein providing a neural network shaping mechanism for at least one sampling layer of the neural network comprises providing a neural network shaping mechanism for a plurality of sampling layers of the neural network, each neural network shaping mechanism comprising a corresponding learnable scaling factor between a sampling rate of a corresponding sampling layer and an additional sampling function based on input to the corresponding sampling layer.

18. The computer-implemented method of claim 16, wherein a sampling layer from the at least one sampling layer of the neural network comprises an up-sampling layer.

19. The computer-implemented method of claim 16, wherein a sampling layer from the at least one sampling layer of the neural network comprises a pooling layer.

20. The computer-implemented method of claim 16, further comprising generating, using an interpolation layer of the neural network shaping mechanism, a third feature map based on the linear interpolation between the first feature map and the second feature map.

* * * * *